United States Patent
Thiruchengode Vajravel et al.

(10) Patent No.: US 12,153,797 B2
(45) Date of Patent: Nov. 26, 2024

(54) HYBRID STORAGE DEVICE WITH DATA MIGRATION FOR AN INFORMATION HANDLING SYSTEM

(71) Applicant: Dell Products L.P., Round Rock, TX (US)

(72) Inventors: Gokul Thiruchengode Vajravel, Bangalore (IN); Young Hwan Jang, Gwangju (KR); Chai Im Teoh, Singapore (SG); Min Thu Aung, Singapore (SG)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 17/813,690

(22) Filed: Jul. 20, 2022

(65) Prior Publication Data
US 2024/0028205 A1    Jan. 25, 2024

(51) Int. Cl.
G06F 3/06    (2006.01)

(52) U.S. Cl.
CPC .......... *G06F 3/0611* (2013.01); *G06F 3/0644* (2013.01); *G06F 3/0647* (2013.01); *G06F 3/0679* (2013.01)

(58) Field of Classification Search
CPC .... G06F 3/0611; G06F 3/0644; G06F 3/0647; G06F 3/0679
See application file for complete search history.

(56) References Cited

U.S. PATENT DOCUMENTS

| | | | |
|---|---|---|---|
| 8,984,099 B1* | 3/2015 | Giencke | G06Q 30/0241 709/219 |
| 2009/0192706 A1* | 7/2009 | Nomura | G01C 21/3859 701/533 |
| 2010/0306288 A1* | 12/2010 | Stein | G06F 16/22 711/E12.083 |
| 2012/0159097 A1* | 6/2012 | Jennas, II | G06F 3/0685 711/E12.001 |
| 2013/0111129 A1* | 5/2013 | Maki | G06F 9/461 711/E12.016 |
| 2013/0265825 A1* | 10/2013 | Lassa | G06F 3/0655 365/185.11 |

(Continued)

OTHER PUBLICATIONS

NVM Express, Inc., "NVM Express revision 1.2a", Oct. 23, 2015.
(Continued)

*Primary Examiner* — Michael Krofcheck
(74) *Attorney, Agent, or Firm* — Norton Rose Fulbright US LLP (57) ABSTRACT

Aspects of this disclosure improve data availability by decreasing access times to obtain data from the storage device while still providing high memory density. A method may include receiving, by a controller of a non-volatile solid-state storage device, data with tags to be stored in a first portion configured as a first type and a second portion configured as a second type; receiving, by the controller, a storage command comprising an indicator, wherein at least some data associated with a tag identified by the indicator is stored in the first portion; and writing, by the controller based on receiving the storage command, the at least some data associated with the tag identified by the indicator from the first portion to the second portion. Other aspects are also disclosed.

14 Claims, 8 Drawing Sheets

(56) References Cited

U.S. PATENT DOCUMENTS

| | | | |
|---|---|---|---|
| 2014/0137102 A1* | 5/2014 | Chan | H04L 67/06 |
| | | | 717/177 |
| 2019/0267080 A1* | 8/2019 | Natarajan | G11C 16/10 |
| 2020/0108322 A1* | 4/2020 | Hou | A63F 13/48 |
| 2020/0183470 A1* | 6/2020 | Lee | G06F 1/26 |
| 2020/0201768 A1* | 6/2020 | Odhiambo | G06F 16/172 |
| 2020/0310822 A1* | 10/2020 | Delaney | G06F 3/04817 |

OTHER PUBLICATIONS

Onufryk, Peter, "How the Streamlined Architecture of NVM Express Enables High Performance PCIe SSDs", IDT, Flash Memory Summit, 2012, Santa Clara, California.

* cited by examiner

| App name | File ext | Unique Tag-ID |
|---|---|---|
| 402 — App 1 | Texture file | A001 |
| | HD Audio file (.mp3) | A002 |
| | ... | ... |
| 404 — App 2 | Drawing file (.dwg) | B001 |
| | ... | ... |

| Executable name | App Type | Launch time (pattern) | App Installed location | Files taking longer time (>500 ms) to load |
|---|---|---|---|---|
| 502 — App 1 | Game | 8PM (everyday) | C:\App1\ | <texture_file> <audio_file>.mp3 |
| 504 — App 2 | Design/Engineering tool | 9:30AM (weekdays) | %ProgramFiles%\App2\ | <full_path>\Design.dwg |

HYBRID STORAGE DEVICE WITH DATA MIGRATION FOR AN INFORMATION HANDLING SYSTEM

FIELD OF THE DISCLOSURE

The instant disclosure relates to information handling systems. More specifically, portions of this disclosure relate to storage systems for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The amount of information that information handling systems process and/or store continues to increase. For example, data for applications executed on high resolution displays includes higher resolution graphics content. As another example, data for applications executed on surround sound audio systems includes higher resolution audio content and additional audio channels corresponding to, for example, 5.1, 7.1, 9.1, 11.1, or higher channels of surround sound content. In these examples, the audio and graphics content consume more storage, which places a demand on information handling systems to provide more storage. Additionally, increases in information handling system processing speed demands faster access to the larger files in order to remain responsive to user input and user requests. The demands for increased storage and increased access speeds to storage are both further challenged by demands to further reduce size of the information handling system.

Aspects of this disclosure implement a hybrid storage device, which provides both higher-density storage of data and quicker access times to the data. Hybrid storage devices may include a single physical structure for memory cells, in which a first portion of the memory cells are configured for one priority and a second portion of the memory cells are configured for another priority. For example, a hybrid storage device may have a first portion of storage configured with a memory cell type that provides higher-density storage and slower access to data and a second portion of storage configured with a memory cell type that provides quicker access to data (than the first portion) and lower-density storage (than the first portion). In some embodiments of a hybrid storage device, the first portion may be a quad-level cell (QLC) capable of storing two bits of information (e.g., four bits per cell corresponding to 1111, 1110, 1101, 1100, 1011, 1010, 1001, 1000, 0111, 0110, 0101, 0100, 0011, 0010, 0001, 0000) and the second portion may be a single-level cell (SLC) capable of storing one bit of information (e.g., two levels corresponding to 0, 1).

Although QLC and SLC memory cell types are used in some example embodiments, other embodiments may user other configurations of higher-level cells (HLCs) and reduced level cells (RLCs), in which RLCs store fewer bits than HLCs. RLC or SLC memory cells may have quicker access times because they have fewer levels and thus larger noise margins during read-out of the cells. HLC or QLC memory cells may have higher storage density because they allow two, three, or more bits to be stored in a single memory cell. As used herein, access speed may refer to a time to begin transfer of the requested data from the memory cells, a data rate at which the requested data is transferred from the memory cells, or a total time to complete data transfer of the requested data from receipt of the request command at the storage device to output of the last bit of the requested data to a bus coupling the storage device to another component.

In some aspects of this disclosure, data may be transferred between two or more portions of a hybrid storage device to prioritize an aspect of accessing the data corresponding to the characteristics of the portion of the device storing the data. For example, the data may be stored in a first portion of the device when increasing storage density of the data is prioritized and the data may be stored in a second portion of the device when increasing access speed to the data is prioritized. When certain data is prioritized for lower access time the data, if present in the first portion, may be copied or moved to the second portion. Information regarding the use of the information handling system may indicate an upcoming request or a likelihood of an upcoming request for particular data in the hybrid storage device. That particular data may be pre-emptively or on-demand copied or moved from the first portion of storage to the second portion of storage. Although two portions of a memory device are described in embodiments herein, the hybrid storage device may include three or more portions of memory, each having different characteristics and data copied or moved into those portions to obtain a desired characteristic for access to the data.

According to one embodiment, a method may include receiving, by a controller of a non-volatile solid-state storage device, data with tags to be stored in a first portion of the non-volatile solid-state storage device configured as a first type and a second portion of the non-volatile solid-state storage device configured as a second type; receiving, by the controller of the non-volatile solid-state storage device, a storage command comprising an indicator, wherein at least some data associated with a tag identified by the indicator is stored in the first portion of the non-volatile solid-state storage device; and writing, by the controller of the non-volatile solid-state storage device based on receiving the storage command, the at least some data associated with the tag identified by the indicator from the first portion to the second portion of the non-volatile solid-state storage device.

In certain embodiments, the first portion of the non-volatile solid-state storage device configured as the first type is configured with increased memory density above a memory density of the second portion and/or the second portion of the non-volatile solid-state storage device configured as the second type is configured with decreased access times lower than access times of the first portion.

In certain embodiments, the first portion comprises memory cells configured as multi-level cells (MLCs) and the second portion comprises memory cells configured as single-level cells (SLCs).

In certain embodiments, the method may include configuring, by the controller of the non-volatile solid-state storage device, a first subset of one or more banks of the non-volatile solid-state storage device as single-level cells (SLCs) and a second subset of the one or more banks as multi-level cells (MLC).

In certain embodiments, the indicator of the storage command is determined based on a predictive algorithm determining the at least some data associated with the tag has an increased likelihood of access within a predetermined amount of time; the predictive algorithm determines the increased likelihood of access based on at least one of temporal, geospatial, or patterns of data usage; the indicator of the storage command corresponds to one or more game files determined based on the predictive algorithm determining that the game files associated with the tag have an increased likelihood of access within a predetermined amount of time; and/or the indicator of the storage command corresponds to one or more game files associated with a subsequent level to a current level, the one or more game files associated with the subsequent level having an increased likelihood of access by a gaming application within a predetermined amount of time based on the gaming application currently accessing game files associated with the current level.

According to another embodiment, an apparatus may include one or more banks of non-volatile solid-state storage, the one or more banks comprising a first portion configured as a first type and a second portion configured as a second type; and a storage controller coupled to the one or more banks and configured to manage data stored in the one or more banks, wherein the storage controller comprises a processor or other logic circuitry configured to perform the steps described in methods described herein.

According to a further embodiment, an information handling system may include a storage device, a memory, and a processor coupled to the memory and to the storage device. The storage device may include a plurality of banks of non-volatile memory comprising a first portion configured as a first type and a second portion configured as a second type; and a storage controller coupled to the plurality of banks and configured to read data and write data to the plurality of banks. The processor may be configured to perform steps described in methods described herein including, for example, writing, to the storage device, data with tags to be stored in the first portion configured as the first type; and transmitting, to the storage device, a storage command comprising an indicator, wherein at least some data associated with a tag identified by the indicator is stored in the first portion. The storage controller of the storage device may be configured to write, based on receiving the storage command, the at least some data associated with the tag identified by the indicator from the first portion to the second portion.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Aspects of the disclosure include apparatuses, configurations, and/or data access methods for improving data read time in a non-volatile solid-state data storage device by moving tagged data from a first type of storage that is configured to store high-density data to a second type of storage that is configured for faster access time to data. In one embodiment, the data to be moved is identified on demand. In another embodiment, the data to be moved is identified using one or more of temporal, geospatial, and/or access patterns and other information.

Figure 1A:
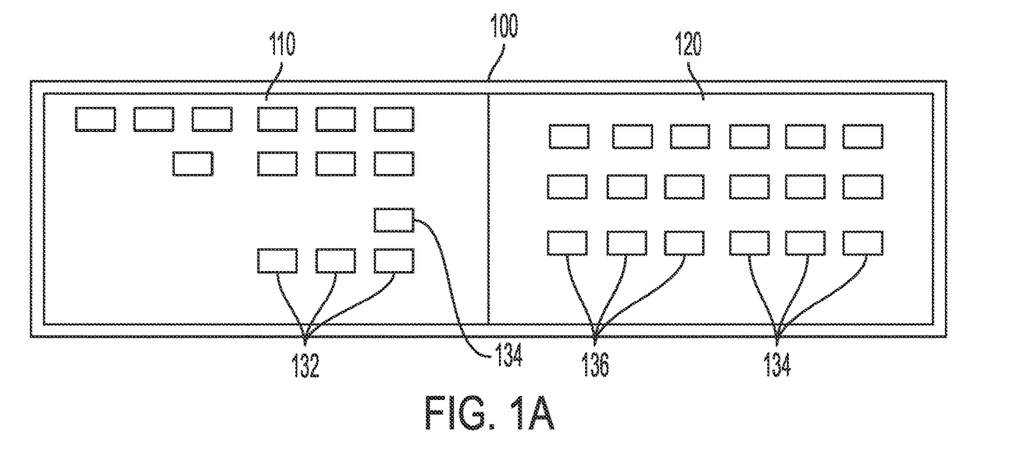
FIG. 1A is a block diagram illustrating a storage device with data stored randomly between two types of available memory cells according to some embodiments of the disclosure.
Figure 1B:
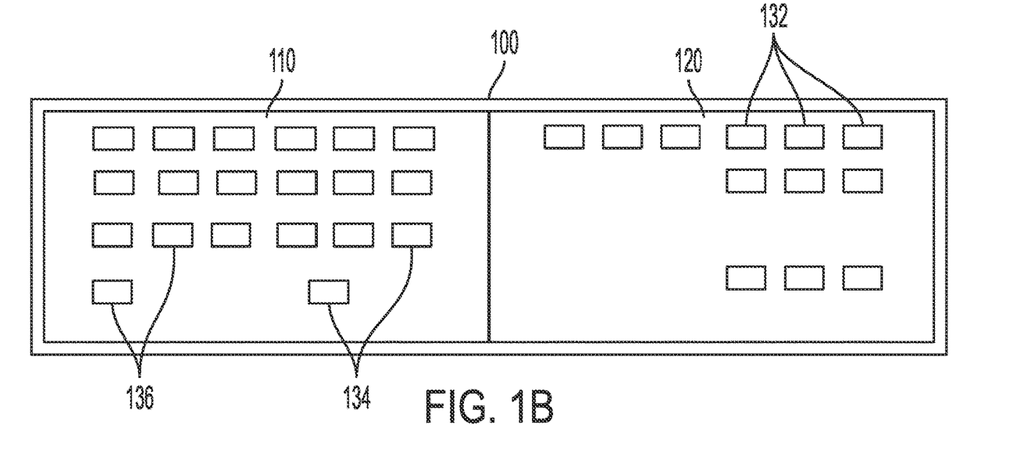
FIG. 1B is a block diagram illustrating a storage device with data stored with prioritized access to certain data available based on storage in one type of available memory cells according to some embodiments of the disclosure.

FIG. 1A and FIG. 1B illustrate a hybrid storage device and reorganization of data within the device. FIG. 1A is a block diagram illustrating a storage device with data stored randomly between two types of available memory cells according to some embodiments of the disclosure. Data may be migrated between the two types of available memory cells in the memory device based on, for example, predicted access to certain portions of data, such that access to the predicted data is faster. FIG. 1B is a block diagram illustrating a storage device with data stored with prioritized access to certain data available based on storage in one type of available memory cells according to some embodiments of the disclosure.

Referring to FIG. 1A, the non-volatile solid-state data storage device 100 includes a second type 110 and a first type 120 of cells storage. Each type 110, 120 of storage may store a mixture of first data 136, second data 134, and first data 132. Data may be reorganized within the different types 110, 120 of cells in storage device 100. For example, data may be reorganized to place certain data in the first type 110 and certain other data in second type 120. In some embodiments, memory cells of the first type 110 are part of a first set of banks within the storage device and memory cells of the second type 120 are part of a second set of banks within the storage device. A memory bank may be a set of memory cells that share components including one or more of read-out circuitry, address decoding, data latches, and/or control logic. For example, a memory bank may be a set of memory cells that share a column decoder (CD), secondary sense amplifiers (SSA), and/or row decoders (RD). Each of the first and/or second types 110, 120 may include one or multiple memory banks of the corresponding type.

Referring to FIG. 1B, the second data 134 and third data 136 has been moved to the second type 110 of storage from the first type 120 of storage. Additionally, the first data 132 has been moved from the second type 110 of storage to the first type 120 of storage. The presence of first data 132 in first type 120 of storage allows quicker access to the first data 132 by an information handling system. For example, when first data 132 is code for an application known to be executed around a certain time of day, the first data 132 may be preloaded into the first type 120 of storage around the certain time of day. Other techniques for arranging data between the first type 120 and second type 110 of storage are described herein.

Figure 2A:
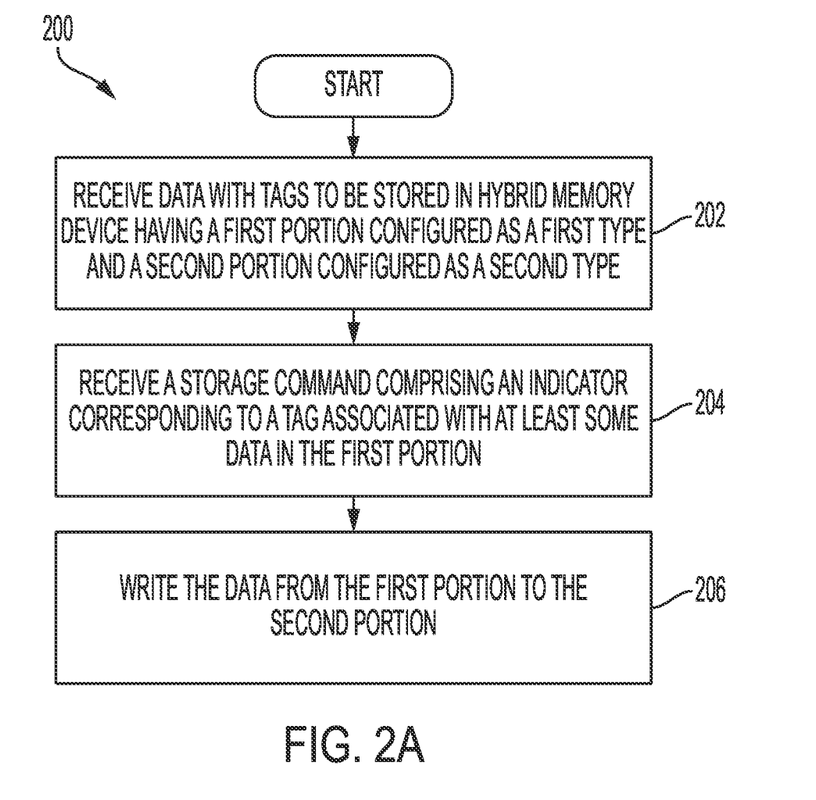
FIG. 2A is a flow chart illustrating a method of operating a storage device according to some embodiments of the disclosure.

FIG. 2A is a flow chart illustrating a method of operating a storage device according to some embodiments of the disclosure. Method 200 may be performed, for example, by an SSD controller in a storage device coupled to an information handling system. At block 202, the SSD Controller receives data with tags to be stored in a hybrid storage device having a first portion of cells configured as a first type and a second portion of cells configured as second type. The tags may include an identifier to allow identifying within the storage device for example, the first data 132, the second data 134, and the third data 136. The tags may be label data to allow moving of specific data between the first portion and the second portion. The tags may be communicated to the storage device as, for example, an NVMe Directive ID and/or D type.

At block 204, the SSD controller receives a storge command including an indicator corresponding to a tag associated with data stored in the device. For example, the indicator may specify one of the first data 132, second data 134, and third data 136. The storage command may also indicate a target portion of the device for storing the data associated with the received indicator to place some of the tagged data in, e.g., the second type of storage. The storage command may suggest certain information access to the storage device, such as in a Data Set Mangaement (DSM) hint.

At block 206, the SSD controller then writes the indicated tagged data to the second type 110 of storage. In some embodiments, the write of block 206 may be a move operation, in which the data associated with the indicator is also deleted from an original location. In some embodiments, the write of block 206 may be a copy operation, in which the data associated with the indicator remains in the original location.

Figure 2B:
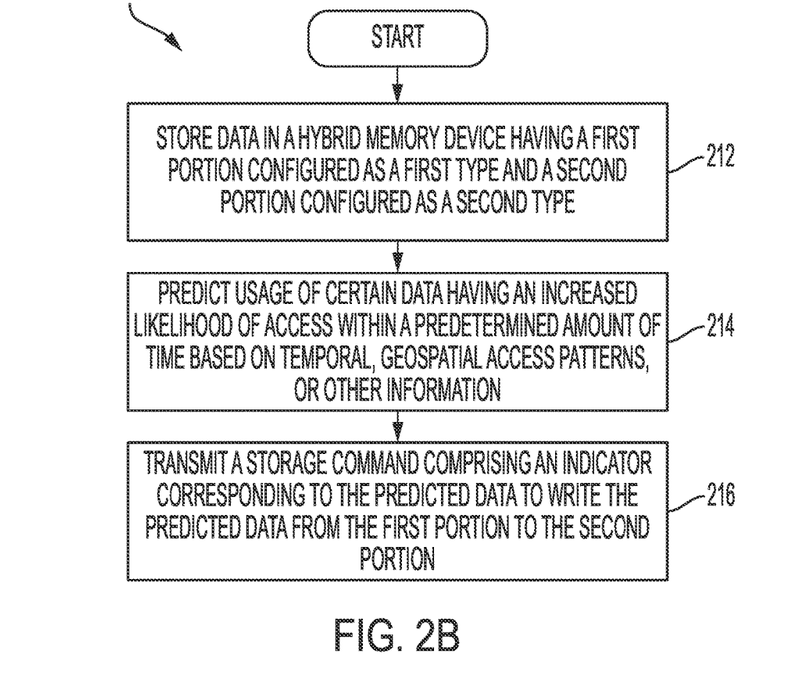
FIG. 2B is a flow chart illustrating a method of operating a storage device according to some embodiments of the disclosure.

FIG. 2B is a flow chart illustrating a method of operating a storage device according to some embodiments of the disclosure. Method 210 may be executed, for example, by an operating system (O/S) service to position data within the storage device. In some embodiments, the repositioning of data in the device may be based on a predicted usage, such as by identifying a likelihood of certain data for access at certain times. The O/S service may use temporal, geospatial, and/or access patterns and/or other information. The O/S service may then transmit a storage command to the storage device comprising an indicator corresponding to the predicted data to write the predicted data from a first portion of storage to a second portion of storage.

Figure 3:
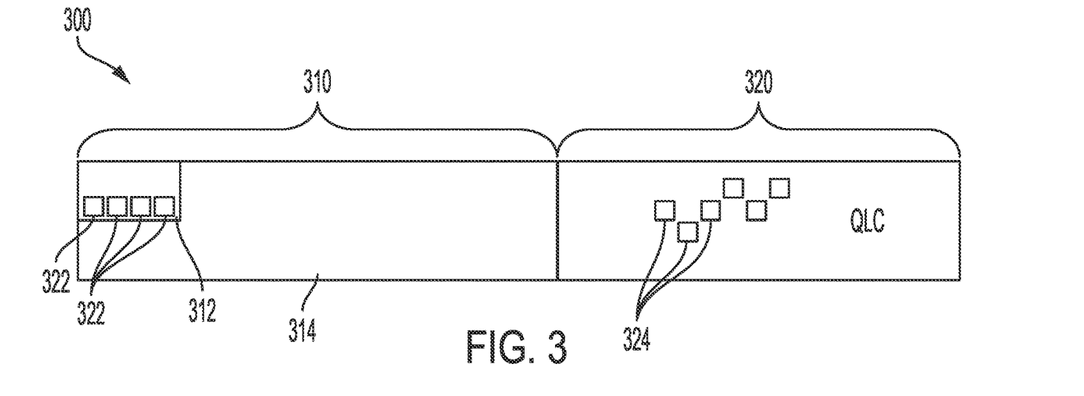
FIG. 3 is a block diagram illustrating a reconfiguration of the storage device according to some embodiments of the disclosure.

A storage device may have storage cells that can be reconfigured between first type 120 and second type 110 of cells. FIG. 3 is a block diagram illustrating a reconfiguration of the storage device according to some embodiments of the disclosure. A first portion 310 of storage cells may include cells that may be configured as quad-level cells (QLC) or other multi-level cells (MLC) or as single-level cells or other reduced-level cells (RLC). Reduced-level cell refers to a cell reconfigured to a lower number of storage levels. For example, a reduced level from quad-level may be bi-level, and another example of a reduced level from quad-level may be single level. A second portion 320 of storage cells may include cells that may be configured as quad-level cells (QLC) or other multi-level cells (MLC) or as single-level cells or other reduced-level cells (RLC). When the first portion 310 is reconfigured from QLC to SLC, the storage capacity reduces from a size shown as block 314 to a smaller size shown as block 312. Block 312 may store data 322 with various tags. The second portion 320 may be configured as QLC cells, which have a higher storage density than when configured as SLC cells.

Figure 4:
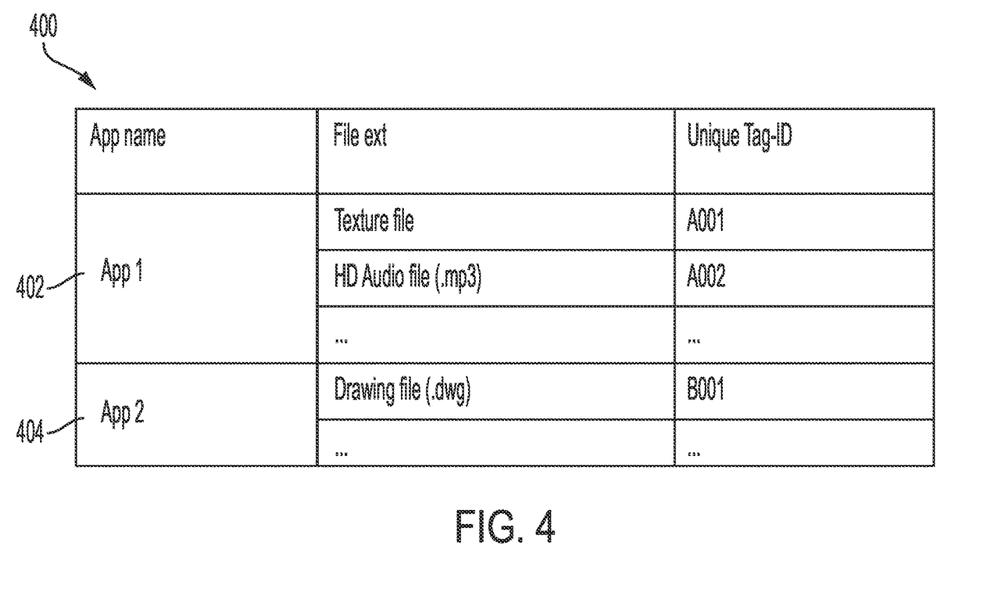
FIG. 4 is a table illustrating a look-up table (LUT) for identifying data in a storage device with tags according to some embodiments of the disclosure.

FIG. 4 is a table illustrating a look-up table (LUT) for identifying data in a storage device with tags according to some embodiments of the disclosure. Table 400 shows a first application 402 and a second application 404 having files with unique Tag-IDs. In some embodiment, these tags may be used as an indicator with a storage command to instruct the SSD controller to store the data in either the first type 120 or second type 110 of storage.

Figure 5:
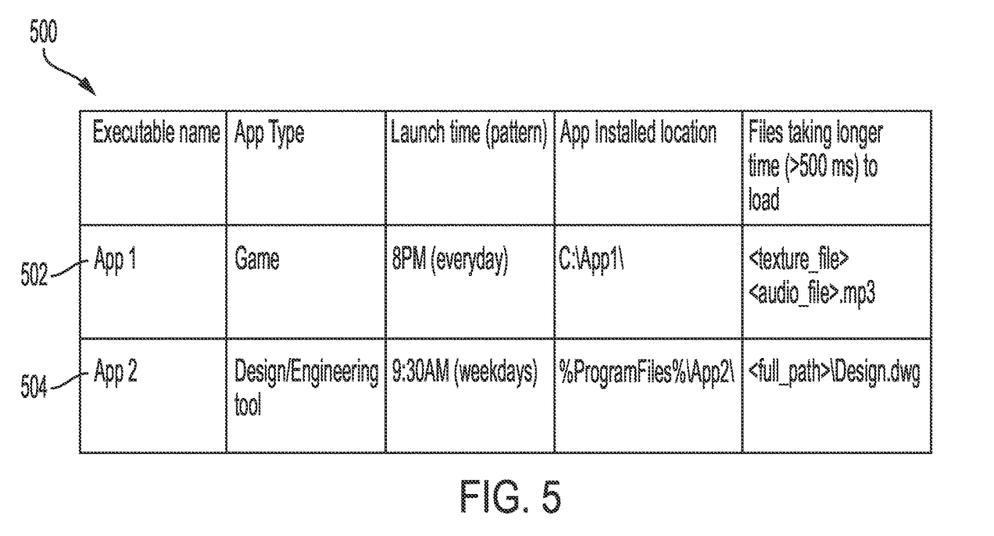
FIG. 5 is a table illustrating a look-up table (LUT) for predicting data usage according to some embodiments of the disclosure.

FIG. 5 is a table illustrating a look-up table (LUT) for predicting data usage according to some embodiments of the disclosure. Table 500 shows a usage pattern for applications 502 and 504 with an associated expected launch time, installation location, and listing of files associated with each application determined to have a load time exceeding a threshold that may adversely impact user experience (e.g., 500 milliseconds). The table 500 may be used, such as by an O/S service as described herein, to determine which data is moved from the first to the second type for first application 502 and second application 504. The O/S service may execute storage commands, such as described with reference to FIG. 2A and FIG. 2B, based on the usage patterns of the table 500.

Figure 6:
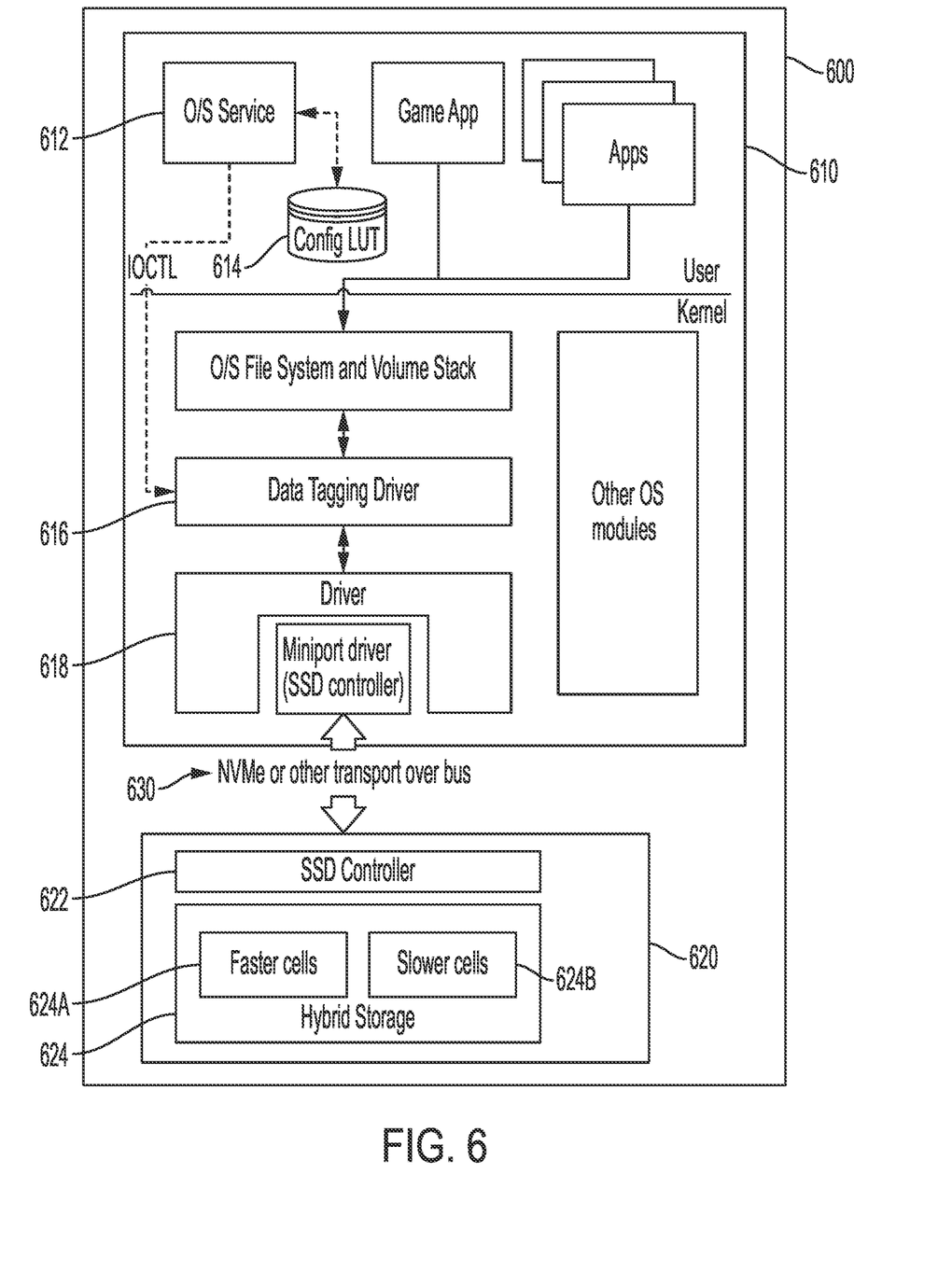
FIG. 6 is a block diagram illustrating a system architecture for operating a hybrid storage device according to some embodiments of the disclosure.

FIG. 6 is a block diagram illustrating a system architecture for operating a hybrid storage device according to some embodiments of the disclosure. The O/S service 612 communicates with Configuration Look-up Table (LUT) 614 and Data Tagging Driver 616. Data Tagging Driver 616 communicates with Miniport Driver 618. The Miniport Driver 618 uses bus 630 to send signals (e.g., commands and/or data) to the SSD Controller 622 within the storage device 620. SSD Controller 622 communicates with the hybrid storage 624, e.g., over an internal bus. The hybrid storage 624 may include a first portion configured as a first type of storage 624B and a second portion configured as a second type of storage 624A.

Figure 7:
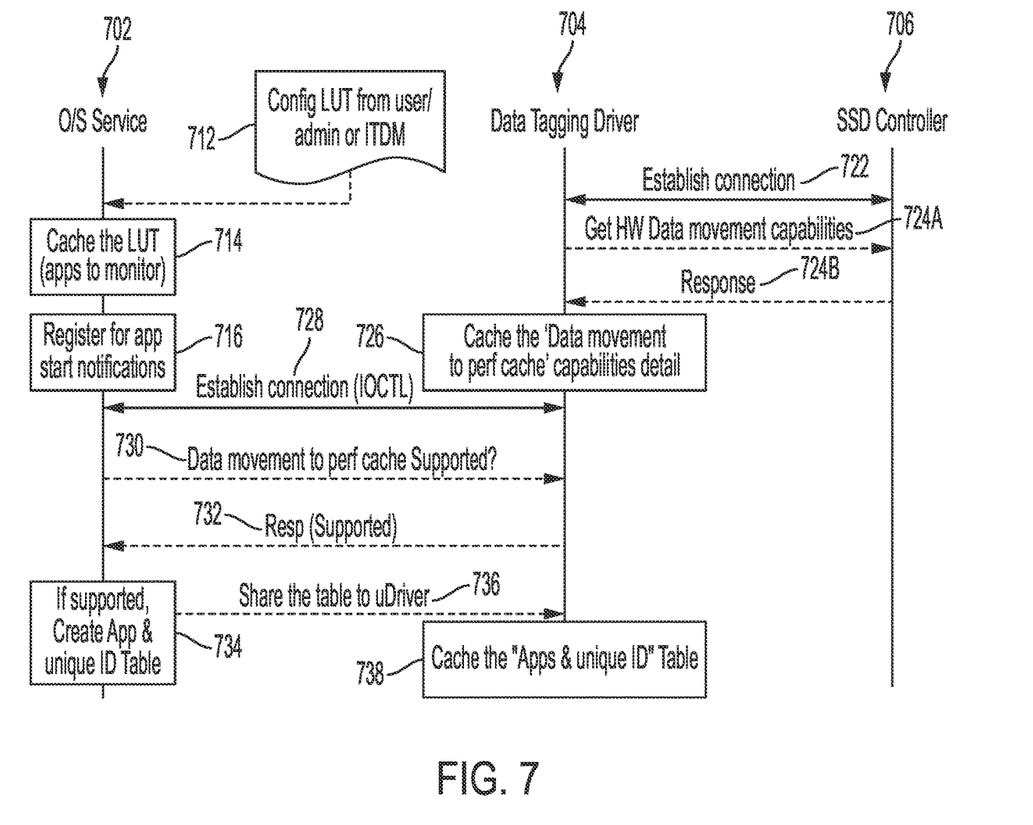
FIG. 7 is a call flow diagram illustrating communications for operating a hybrid storage device according to some embodiments of this disclosure.

One manner of operating an information handling system such as shown in FIG. 6 involves example communications shown in FIG. 7. FIG. 7 is a call flow diagram illustrating communications for operating a hybrid storage device according to some embodiments of this disclosure. The call flow diagram includes O/S Service 702, Data Tagging Driver 704, and SSD Controller 706. The O/S Service 702 may cache, at step 714, the Configuration LUT (Look Up Table) retrieved at step 712. Next, at step 716, the O/S Service 702 registers for application start notifications. In parallel, the Data Tagging Driver 704 establishes a connection at step 722 with the SSD Controller 706. The Data Tagging Driver 704 requests at call 724A and receives at call 724B confirmation that SSD Controller 706 may properly migrate data as requested. This response at call 724B is cached at step 726. The O/S Service 702 may register applications for start notifications at step 716. O/S Service 702 will then establish a connection at step 728 from Data Tagging Driver 704. O/S Service 702 will query at step 730 to Data Tagging Driver 704 and receive an answer at step 732 from Data Tagging Driver 704 that data movement is supported. If supported, the O/S Service 702 will create entries in a table with an application name and unique ID at step 734 in a table, such as the table shown in FIG. 4. The O/S Service 702 may share the table at step 734 with the Data Tagging Driver 704, which may then cache at step 738 the table created at step 734.

Figure 8:
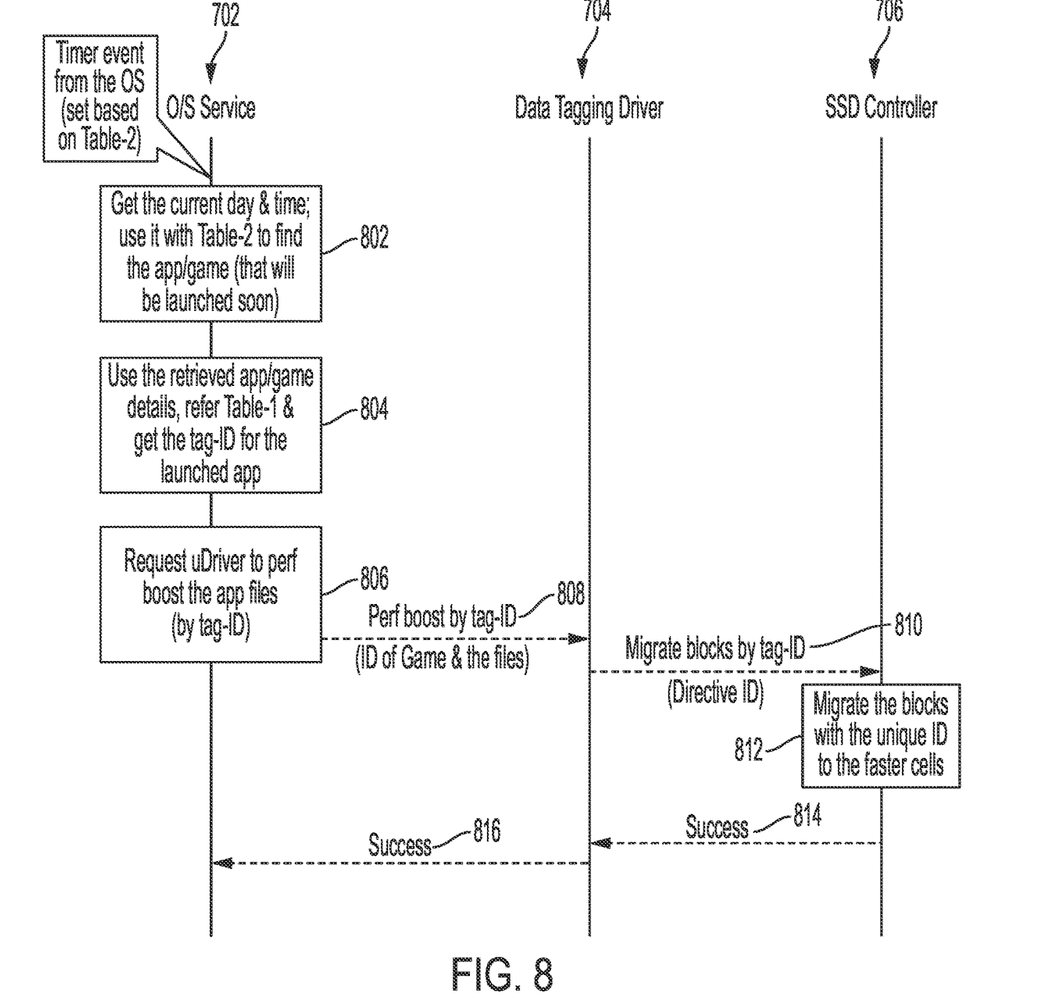
FIG. 8 is a call flow diagram illustrating further communications for operating a hybrid storage device according to some embodiments of this disclosure.

FIG. 8 is a call flow diagram illustrating further communications for operating a hybrid storage device according to some embodiments of this disclosure. Referencing FIG. 8, the O/S Service 702 may access the current date and time and compare it to a launch time (such as by reviewing a determined application execution pattern) at step 802. Information about an application expected at the launch time may include the application installed location and load times information store in a table, such as the table of FIG. 5. If application 1 from table 500 is predicted to be accessed, the O/S Service 702 may access the associated unique Tag-ID at step 804 from, for example, a table such as shown in TABLE 4. The O/S Service 702 may request Data Tagging Driver to improve performance of the files identified at step 806. The Data Tagging Driver 704 may receive the request at step 808 and may pass the request at step 810 to SSD Controller 706. The SSD Controller 706 may migrate, at block 812, the blocks of data with the identified unique Tag-ID to faster memory cells 624A from slower cells 624B. A success signal at call 814 may be sent to Data Tagging Driver 704. The Data Tagging Driver 704 may relay the success signal to the O/S Service 702.

These example embodiments describe and illustrate various capabilities that enable data be more quickly retrieved from the hybrid storage device of an information handling system. The storage device and access techniques may be used in an information handling system, such as described with reference to FIG. 9, in which the storage 928 or storage 924 may be a hybrid storage device or accessed according to the techniques described above. In some embodiments, a data storage device according to embodiments of this disclosure may also be coupled through other interfaces to the information handling system, such as through network interface 940, wireless interface 950, or USB interface 910. The O/S Service and Data Tagging Driver described above may execute on the CPU 902 when the CPU 902 executes non-transitory computer program code stored in the memory 904.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 9.

Figure 9:
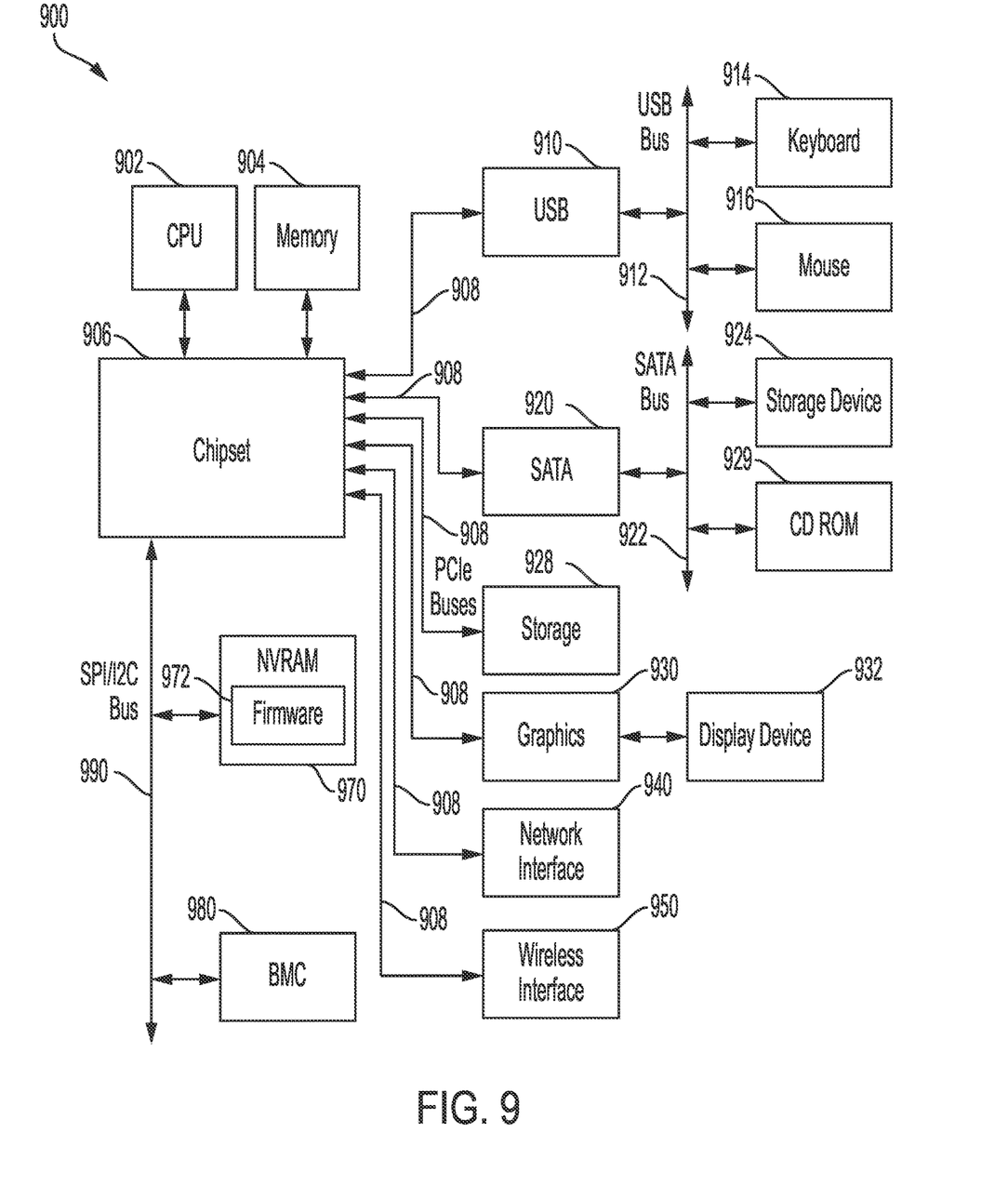
FIG. 9 is a schematic block diagram of an example information handling system according to some embodiments of the disclosure.

FIG. 9 illustrates an example information handling system 900. Information handling system 900 may include a processor 902 (e.g., a central processing unit (CPU)), a memory (e.g., a dynamic random-access memory (DRAM)) 904, and a chipset 906. In some embodiments, one or more of the processor 902, the memory 904 and the chipset 906 may be included on a motherboard (also referred to as a mainboard), which is a printed circuit board (PCB) with embedded conductors organized as transmission lines between the processor 902, the memory 904, the chipset 906, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 902, the memory 904, the chipset 906, and/or other components may be organized as a System on Chip (SoC).

The processor 902 may execute program code by accessing instructions loaded into memory 904 from a storage device, executing the instructions to operate on data also loaded into memory 904 from a storage device, and generate output data that is stored back into memory 904 or sent to another component. The processor 902 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 902 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 906 may facilitate the transfer of data between the processor 902, the memory 904, storage 924 and other components. In some embodiments, chipset 906 may include two or more integrated circuits (ICs), such as a northbridge controller coupled to the processor 902, the memory 904, and a southbridge controller, with the southbridge controller coupled to the other components such as USB 910, SATA 920, and PCIe buses 908. The chipset 906 may couple to other components through one or more PCIe buses 908.

Some components may be coupled to one bus line of the PCIe buses 908, whereas some components may be coupled to more than one bus line of the PCIe buses 908. One example component is a universal serial bus (USB) controller 910, which interfaces the chipset 906 to a USB bus 912. A USB bus 912 may couple input/output components such as a keyboard 914 and a mouse 916, but also other components such as USB flash drives, or another information handling system. Another example component is a SATA bus controller 920, which couples the chipset 906 to a SATA bus 922. The SATA bus 922 may facilitate efficient transfer of data between the chipset 906 and components coupled to the chipset 906 and a storage device 924 (e.g., a hard disk drive (HDD) or hybrid solid-state disk drive (SDD) (624)) and/or a compact disc read-only memory (CD-ROM) 926. The PCIe bus 908 may also couple the chipset 906 directly to a storage device 928 (e.g., a solid-state disk drive (SDD)). A further example of an example component is a graphics device 930 (e.g., a graphics processing unit (GPU)) for generating output to a display device 932, a network interface controller (NIC) 940, and/or a wireless interface 950 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 906 may also be coupled to a serial peripheral interface (SPI) and/or Inter-Integrated Circuit (I2C) bus 960, which couples the chipset 906 to system management components. For example, a non-volatile random-access memory (NVRAM) 970 for storing firmware 972 may be coupled to the bus 960. As another example, a controller, such as a baseboard management controller (BMC) 980, may be coupled to the chipset 906 through the bus 960. BMC 980 may be referred to as a service processor or embedded controller (EC). Capabilities and functions provided by BMC 980 may vary considerably based on the type of information handling system. For example, the term baseboard management system may be used to describe an embedded processor included at a server, while an embedded controller may be found in a consumer-level device. As disclosed herein, BMC 980 represents a processing device different from processor 902, which provides various management functions for information handling system 900. For example, an embedded controller may be responsible for power management, cooling management, and the like. An embedded controller included at a data storage system may be referred to as a storage enclosure processor or a chassis processor.

System 900 may include additional processors that are configured to provide localized or specific control functions, such as a battery management controller. Bus 960 can include one or more busses, including a Serial Peripheral Interface (SPI) bus, an Inter-Integrated Circuit (I2C) bus, a system management bus (SMBUS), a power management bus (PMBUS), or the like. BMC 980 may be configured to provide out-of-band access to devices at information handling system 900. Out-of-band access in the context of the bus 960 may refer to operations performed prior to execution of firmware 972 by processor 902 to initialize operation of system 900.

Firmware 972 may include instructions executable by processor 102 to initialize and test the hardware components of system 900. For example, the instructions may cause the processor 902 to execute a power-on self-test (POST). The instructions may further cause the processor 902 to load a boot loader or an operating system (OS) from a mass storage device. Firmware 972 additionally may provide an abstraction layer for the hardware, such as a consistent way for application programs and operating systems to interact with the keyboard, display, and other input/output devices. When power is first applied to information handling system 900, the system may begin a sequence of initialization procedures, such as a boot procedure or a secure boot procedure. During the initialization sequence, also referred to as a boot sequence, components of system 900 may be configured and enabled for operation and device drivers may be installed. Device drivers may provide an interface through which other components of the system 900 can communicate with a corresponding device. The firmware 972 may include a basic input-output system (BIOS) and/or include a unified extensible firmware interface (UEFI). Firmware 972 may also include one or more firmware modules of the information handling system. Additionally, configuration settings for the firmware 972 and firmware of the information handling system 900 may be stored in the NVRAM 970. NVRAM 970 may, for example, be a non-volatile firmware memory of the information handling system 900 and may store a firmware memory map namespace of the information handling system. NVRAM 970 may further store one or more container-specific firmware memory map namespaces for one or more containers concurrently executed by the information handling system.

Information handling system 900 may include additional components and additional busses, not shown for clarity. For example, system 900 may include multiple processor cores (either within processor 902 or separately coupled to the chipset 906 or through the PCIe buses 908), audio devices (such as may be coupled to the chipset 906 through one of the PCIe busses 908), or the like. While a particular arrangement of bus technologies and interconnections is illustrated for the purpose of example, one of skill will appreciate that the techniques disclosed herein are applicable to other system architectures. System 900 may include multiple processors and/or redundant bus controllers. In some embodiments, one or more components may be integrated together in an integrated circuit (IC), which is circuitry built on a common substrate. For example, portions of chipset 906 can be integrated within processor 902. Additional components of information handling system 900 may include one or more storage devices that may store machine-executable code, one or more communications ports for communicating with external devices, and various input and output (I/O) devices, such as a keyboard, a mouse, and a video display.

In some embodiments, processor 902 may include multiple processors, such as multiple processing cores for parallel processing by the information handling system 900. For example, the information handling system 900 may include a server comprising multiple processors for parallel processing. In some embodiments, the information handling system 900 may support virtual machine (VM) operation, with multiple virtualized instances of one or more operating systems executed in parallel by the information handling system 900. For example, resources, such as processors or processing cores of the information handling system may be assigned to multiple containerized instances of one or more operating systems of the information handling system 900 executed in parallel. A container may, for example, be a virtual machine executed by the information handling system 900 for execution of an instance of an operating system by the information handling system 900. Thus, for example, multiple users may remotely connect to the information handling system 900, such as in a cloud computing configuration, to utilize resources of the information handling system 900, such as memory, processors, and other hardware, firmware, and software capabilities of the information handling system 900. Parallel execution of multiple containers by the information handling system 900 may allow the information handling system 900 to execute tasks for multiple users in parallel secure virtual environments.

The schematic flow chart diagrams of FIGS. 2A, 2B, 7, and 8 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  receiving, by a controller of a non-volatile solid-state storage device, data with tags, to be stored in a first portion of the non-volatile solid-state storage device configured as a first type and a second portion of the non-volatile solid-state storage device configured as a second type;
  storing, by the controller of the non-volatile solid-state storage device, the data in the first portion of the device based on a prioritization for storage density;
  receiving, by the controller of the non-volatile solid-state storage device, a storage command comprising an indicator, wherein at least some data associated with a tag identified by the indicator is in the data stored in the first portion of the non-volatile solid-state storage device; and
  writing, by the controller of the non-volatile solid-state storage device based on receiving the storage command, the at least some data associated with the tag identified by the indicator from the first portion to the second portion of the non-volatile solid-state storage device, wherein the indicator of the storage command is based on determining that the at least some data associated with the tag corresponds to an application having a load time that exceeds a threshold, wherein the indicator of the storage command is determined based on a predictive algorithm determining the at least some data associated with the tag has an increased likelihood of access within a predetermined amount of time, wherein the predictive algorithm determines the increased likelihood of access based on at least geospatial data usage.

2. The method of claim 1, wherein:

the first portion of the non-volatile solid-state storage device configured as the first type is configured with increased memory density above a memory density of the second portion; and the second portion of the non-volatile solid-state storage device configured as the second type is configured with decreased access times lower than access times of the first portion.

3. The method of claim 2, wherein the first portion comprises memory cells configured as multi-level cells (MLCs) and the second portion comprises memory cells configured as single-level cells (SLCs).

4. The method of claim 3, further comprising:

configuring, by the controller of the non-volatile solid-state storage device, a first subset of one or more banks of the non-volatile solid-state storage device as single-level cells (SLCs) and a second subset of the one or more banks as multi-level cells (MLC).

5. The method of claim 1, wherein the indicator of the storage command corresponds to one or more game files determined based on the predictive algorithm determining that the game files associated with the tag have an increased likelihood of access within a predetermined amount of time.

6. The method of claim 1, wherein the application is a gaming application, and wherein the indicator of the storage command corresponds to one or more game files associated with a subsequent level to a current level, the one or more game files associated with the subsequent level having an increased likelihood of access by the gaming application within a predetermined amount of time based on the gaming application currently accessing game files associated with the current level.

7. An apparatus, comprising one or more banks of non-volatile solid-state storage, the one or more banks comprising a first portion configured as a first type and a second portion configured as a second type;

a storage controller coupled to the one or more banks and configured to manage data stored in the one or more banks, wherein the storage controller is configured to perform operations comprising:

storing, by the controller of the non-volatile solid-state storage device, the data in the first portion of the device based on a prioritization for storage density;

receiving a storage command comprising an indicator, wherein at least some data associated with a tag identified by the indicator is in the data stored in the first portion of the one or more banks; and writing the at least some data associated with the tag identified by the indicator from the first portion to the second portion of the one or more banks, wherein the indicator of the storage command is based on determining that the at least some data associated with the tag corresponds to an application having a load time that exceeds a threshold, wherein the indicator of the storage command is determined based on a predictive algorithm determining the at least some data associated with the tag has an increased likelihood of access within a predetermined amount of time, wherein the predictive algorithm determines the increased likelihood of access based on at least geospatial data usage.

8. The apparatus of claim 7, wherein:

the first portion configured as a first type is configured with increased memory density above the second portion; and the second portion configured as a second type is configured with decreased access times lower than the first portion.

9. The apparatus of claim 8, wherein the first portion comprises memory cells configured as multi-level cells (MLCs) and the second portion comprises memory cells configured as single-level cells (SLCs).

10. The apparatus of claim 9, wherein the storage controller is further configured to perform operations comprising:

configuring the first portion of the one or more banks as single-level cells (SLCs) and the second portion of the one or more banks as multi-level cells (MLC).

11. The apparatus of claim 7, wherein the indicator of the storage command corresponds to one or more game files determined based on the predictive algorithm determining that the game files associated with the tag have an increased likelihood of access within a predetermined amount of time.

12. An information handling system, comprising:

a storage device, comprising:

a plurality of banks of non-volatile memory comprising a first portion configured as a first type and a second portion configured as a second type; and a storage controller coupled to the plurality of banks and configured to read data and write data to the plurality of banks;

a memory; and a processor coupled to the memory and coupled to the storage device, wherein the processor is configured to perform steps comprising:

storing, by the controller of the non-volatile solid-state storage device, the data in the first portion of the device based on a prioritization for storage density;

writing, to the storage device, data with tags to be stored in the first portion configured as the first type; and transmitting, to the storage device, a storage command comprising an indicator, wherein at least some data associated with a tag identified by the indicator is in the data stored in the first portion, wherein the indicator of the storage command is based on determining that the at least some data associated with the tag corresponds to an application having a load time that exceeds a threshold, wherein the indicator of the storage command is determined based on a predictive algorithm determining the at least some data associated with the tag has an increased likelihood of access within a predetermined amount of time, wherein the predictive algorithm determines the increased likelihood of access based on at least geospatial data usage, and wherein the storage controller of the storage device is configured to write, based on receiving the storage command, the at least some data associated with the tag identified by the indicator from the first portion to the second portion.

13. The information handling system of claim 12, wherein the first portion comprises memory cells configured as multi-level cells (MLCs) and the second portion comprises memory cells configured as single-level cells (SLCs).

14. The information handling system of claim 12, wherein the indicator of the storage command corresponds to one or more game files determined based on the predictive algorithm determining that the game files associated with the tag have an increased likelihood of access within a predetermined amount of time.

* * * * *